United States Patent [19]

Comfort et al.

[11] 4,356,404

[45] Oct. 26, 1982

[54] CIRCUIT FOR EQUIPPING A VARIABLE NUMBER OF BUS UNITS ON A CLOSED LOOP BUS

[75] Inventors: Joseph A. Comfort; Thomas J. Perry; Michel Loos, all of Phoenix, Ariz.

[73] Assignee: GTE Automatic Electric Labs Inc., Northlake, Ill.

[21] Appl. No.: 267,165

[22] Filed: May 26, 1981

[51] Int. Cl.³ ............................................ H01H 19/14
[52] U.S. Cl. .................................................. 307/115
[58] Field of Search ........................................ 307/115

[56] References Cited

U.S. PATENT DOCUMENTS 3,111,653 11/1963 Massell et al. .................. 307/115 X
3,312,941 4/1967 Booth et al. .................... 307/115 X Primary Examiner—Donald A. Griffin
Attorney, Agent, or Firm—Robert J. Black; Frank J. Bogacz

[57] ABSTRACT

This is a circuit for use to increase the number of bus circuit boards in a closed loop bus configuration. This circuit detects which bus circuit board is the last circuit board equipped in a closed loop configuration and closes the bus at that circuit, without requiring wiring changes or "dummy" circuit boards.

6 Claims, 1 Drawing Figure

CIRCUIT FOR EQUIPPING A VARIABLE NUMBER OF BUS UNITS ON A CLOSED LOOP BUS

CROSS-REFERENCE TO RELATED APPLICATIONS

The present application is related to copending U.S. patent applications Ser. Nos. 163,044; 164,045; 163,046; 163,047; 163,048; and 163,049.

BACKGROND OF THE INVENTION (1) Field of the Invention

The present application is related to digital computer bus structure and more particularly to circular or ring-type bus structures for the interconnection of bus units.

(2) Description of the Prior Art

With the advent of distributed processing, it is advantageous to connect a number of units together via a common bus arrangement. These bus units may comprise central processing units, bus arbitrators or other such circuits.

Further, it is highly desirable to modularize such systems. In so doing, such systems may perform more functions or provide for a larger number of users of the existing functions. Therefore, such systems are able to grow in the number of bus units which are attached to the common bus. Thus, the inherent problem of adding units to a closed loop bus is posed.

One solution to this problem is to physically open all the connections comprising the bus and add another bus unit. This will include the cutting of wires and splicing into each of the leads comprising the closed loop bus. This is not an economical or efficient manner in which to modularly grow a closed loop bus system.

In another solution, when the bus was originally constructed, space for spare bus units (circuit boards) could be reserved in advance for the additional bus units. This could be accomplished in two ways. First, "dummy" circuit boards could be designed to be plugged into existing unused connector positions as placeholders for the future bus units. These "dummy" circuits do nothing more than complete the electrical path along the closed loop from the input to the output of the circuit board. Second, special connectors may be used, arranged so that certain contact leads were shorted together if no circuit board was inserted into the connector.

Both of the above solutions require extensive special hardware. In the first case, special circuit boards, which have no useful function other than placeholders, are required; and, in the second case, special connectors which then must be dismantled when units are added.

Accordingly, it is the object of the present invention to provide a circuit for modularly equipping bus units on a closed loop bus and in an efficient and economical manner without the need for special purpose hardware.

SUMMARY OF THE INVENTION

The circuit disclosed herein provides for connecting a number of bus units on separate circuit boards in a circular closed loop bus configuration. The individual circuits on each circuit board may comprise central processing units or other such circuits as arbitration circuits for controlling the access of a common bus.

In the present invention, each bus unit comprises a printed wiring card with a pluggable connectorized end. Each wiring card contains an arbitration circuit corresponding to a particular central processing unit. Since the present configuration contains a number of central processing units, there is a corresponding number of arbitration circuits. The logic of these arbitration circuits is designed for a closed loop data bus. A first data bus connects the first of the bus units to each of the succeeding bus units in an open bus configuration. A second bus connects a first bus unit to the second bus unit, the second bus unit to the succeeding bus unit and the succeeding bus unit to the last bus unit in the loop. The last bus unit closes the connection to the first bus, thereby forming a closed loop bus.

Each bus unit further includes a switching device connected between the first bus and the second bus. The switching device is normally non-operated so that there is no closure between first and second buses. This non-operation occurs because of an electrical ground connection between the second bus unit and the first bus unit which is made only if the second bus unit is plugged into its position in the loop. This non-operation of the closure of the first and second buses continues as each succeeding bus unit is plugged into its respective connector position in the loop. The last bus unit that is equipped in this configuration will not obtain the electrical ground for the corresponding next bus unit since there is none. This will cause the switching device to operate to connect each of the leads comprising the first bus to a corresponding leads of the second bus, thereby forming a closed loop bus.

In this way, any number of bus units may be sequentially added to the closed loop configuration without extensive rewiring or the addition of temporary "dummy" bus units.

DESCRIPTION OF THE DRAWINGS

A single sheet of drawings included herewith is a schematic diagram embodying the principles of operation of the present invention.

DESCRIPTION OF THE PREFERRED EMBODIMENT

Figure 1:
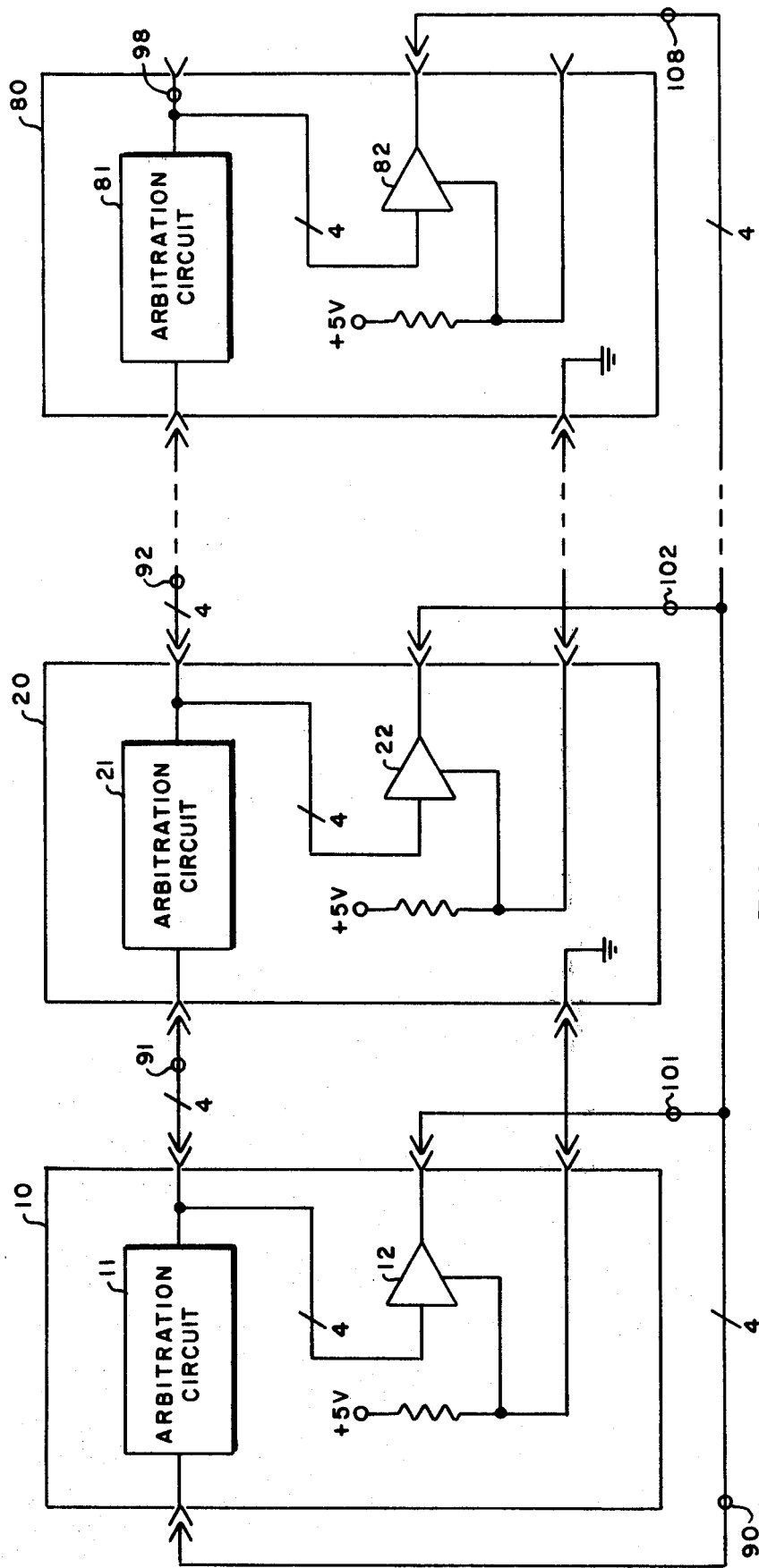

Referring to FIG. 1, a number of bus units (printed wiring cards) 10, 20 . . . 80 are shown. Each bus unit contains a corresponding arbitration circuit, that is, bus unit 10 contains arbitration circuit 11, bus unit 20 contains arbitration circuit 21, etc. Each bus unit has the inputs and outputs of a four bit wide data bus connected on card edge connectors. Bus unit 10 is connected via a four bit wide data bus 90 to the output bus of each bus unit 10 through 80. This is accomplished by a connection of bus segments 101 through 108 to bus 90.

Each bus unit is connected via a four bit wide data bus to the next succeeding bus unit in the array. That is, bus unit 10 is connected to bus unit 20 via data bus 91; bus units 20 is connected to bus unit 30 (now shown) via data bus 92; and bus unit 70 is connected to bus unit 80 via data bus 97. Each of the bus segments 91 through 97 is a four bit wide data bus.

Each bus segment 91 through 98 is able to connect to bus 90 via a tri-state buffer element and the corresponding data bus 101 through 108. That is, bus segment 91 is connected through tri-state buffer 12 through bus 101 to bus 90. Bus segment 92 is connected through tri-state buffer 22, through bus segment 102 to bus 90. Bus segment 98 is connected through tri-state buffer element 82, through bus 108 to bus 90. All bus units not shown are connected via the corresponding buses in a similar fashion.

Tri-state buffer elements 12, 22 . . . 82 may be implemented with integrated circuit part number 74 LS 241, which is an octal buffer and line driver with three state outputs. Each line comprising the bus requires one tri-state buffer. Therefore, each four bit data bus requires four of the eight of the tri-state buffer elements on the integrated circuit. The other four tri-state buffer gates may remain unused. Bus widths larger than eight bits may be accommodated by adding additional integrated circuits of this type.

The enable input of each tri-state buffer element is connected via a cable connection to the next bus unit in the array. That is, bus unit 10 has its corresponding tri-state buffer element 12 connected to a termination on bus unit 20; bus unit 20 has its corresponding tri-state buffer element 22 connected via a cable connection to a termination on bus unit 30 (not shown); etc. Each bus unit that is equipped in the array has a ground connection connected to the enable input of the previous bus unit's tri-state buffer element. For example, a ground connection on bus unit 20 is connected to the enable input of tri-state buffer 12 located on bus unit 10.

In normal operation, a ground connection on the enable input of the tri-state buffer element disables that buffer element from making a completed circuit between the bus segment (91 through 98) and bus 90. Therefore, each succeeding bus unit that is equipped in the array disables the preceding bus unit from forming a closed bus loop by disabling its respective tri-state bufferelement. For example, if bus unit 20 is equipped bus unit 10 is prohibited via tri-state buffer element 12 from connecting bus segment 91 to bus 101. Each succeeding bus unit that is equipped operates its predecessor in a similar fashion.

The last bus unit 80 which is shown has no succeeding bus unit and therefore no ground connection is made on the enable input of tri-state buffer element 82. Therefore, tri-state buffer element 82 is operated to make electrical contact between each lead comprising the bus segment 98 to bus segment 108. Thereby, a closed loop bus arrangement is formed between each of the equipped bus units 10 through 80. Although eight bus units are shown in this embodiment, the design is not limited to eight units, however there must be a minimum of at least two bus units for the above described circuit to be operable.

Although a preferred embodiment of the invention has been illustrated, and that form described in detail, it will be readily apparent to those skilled in the art that various modifications may be made therein, without departing from the spirit of the invention or from the scope of the appended claims.

What is claimed is:

1. A circuit for equipping a variable number of bus units on a tri-state bus comprising:

a plurality of bus units including a first and at least one succeeding bus unit, the number of said succeeding bus units being selectively variable;

first tri-state bus means connected between said first bus unit and each said succeeding bus unit;

a plurality of tri-state buffer elements corresponding to said plurality of bus units, each said corresponding tri-state buffer element connected to said first bus unit via said first tri-state bus means;

sequentially expandable tri-state bus means connected between said first bus unit and said succeeding bus unit, said sequentially expandable tri-state bus means series connected between a succeeding bus unit and a next succeeding bus unit for each of said variable number of succeeding bus units;

means for connecting said tri-state buffer element of each corresponding bus unit to said next succeeding bus unit, each said succeeding bus unit effective to maintain said succeeding tri-state buffer element in a high impedance state;

means for operating said tri-state buffer element of a last succeeding bus unit whereby said first tri-state bus means is connected to said sequentially expandable tri-state bus means for forming an expanded closed loop connection of said selectively variable number of bus units.

2. A circuit as claimed in claim 1, wherein: each of said tri-state buffer element includes an enable input, data input and a data output.

3. A circuit as claimed in claim 2, wherein said means for connecting comprises: an electrical ground connection from said succeeding bus unit to said enable input of said tri-state buffer element of said first bus unit; and further an electrical ground connection from said next succeeding bus unit to said enable input of said tri-state buffer element of said succeeding bus unit.

4. A circuit as claimed in claim 3, wherein: said first tri-state bus means includes a data bus connected from said first bus unit to said data output of each said tri-state buffer element of each selected bus unit.

5. A circuit as claimed in claim 4, wherein: said sequentially expandable tri-state bus means includes a plurality of data bus segments;

a first one of said data bus segments connected between said first bus unit and said succeeding bus unit;

another one of said bus segments connected between said succeeding bus unit and said next succeeding bus unit;

at last one of said bus segments connected between said next succeeding bus unit and said last succeeding bus unit.

6. A circuit as claimed in claim 1, wherein: said means for operating includes a voltage source; and a connection from said voltage source to said enable input of said tri-state buffer element of said last succeeding bus unit whereby said tri-state buffer element is operated to maintain a low impedance connection from said data input to said data output.

* * * * *